United States Patent
O'Neill et al.

(10) Patent No.: US 6,442,162 B1
(45) Date of Patent: Aug. 27, 2002

(54) CREDIT-BASED SCHEME FOR HIGH PERFORMANCE COMMUNICATION BETWEEN DEVICES IN A PACKET-BASED COMMUNICATION SYSTEM

(75) Inventors: Eugene O'Neill; Una Quinlan; Anne G. O'Connell, all of Dublin (IE)

(73) Assignee: 3Com Technologies, Georgetown, KY (US)

(*) Notice: Subject to any disclaimer, the term of this patent is extended or adjusted under 35 U.S.C. 154(b) by 0 days.

(21) Appl. No.: 09/253,538

(22) Filed: Feb. 22, 1999

(30) Foreign Application Priority Data

Nov. 17, 1998 (GB) .............................. 9825044

(51) Int. Cl.[7] .......................... H04L 12/28; H04L 12/54
(52) U.S. Cl. ........................................ 370/389; 370/428
(58) Field of Search ................................ 370/360, 362, 370/363, 368, 371, 378, 381, 383, 389, 412, 411, 413, 417

(56) References Cited

U.S. PATENT DOCUMENTS

| | | | |
|---|---|---|---|
| 4,475,192 A | | 10/1984 | Fernow et al. |
| 4,780,889 A | | 10/1988 | Ley et al. |
| 5,528,591 A | | 6/1996 | Lauer |
| 5,550,860 A | | 8/1996 | Georgiou et al. |
| 5,642,386 A | | 6/1997 | Rocco, Jr. |
| 5,757,297 A | | 5/1998 | Ferraiolo et al. |
| 5,923,852 A | * | 7/1999 | Lee et al. .................. 709/234 |
| 5,950,115 A | | 9/1999 | Momtaz et al. |
| 5,970,103 A | | 10/1999 | Townshend |
| 6,154,816 A | * | 11/2000 | Steely et al. ................ 711/150 |
| 6,252,849 B1 | * | 6/2001 | Rom et al. .................. 370/230 |

FOREIGN PATENT DOCUMENTS

| | | |
|---|---|---|
| EP | 0 153 107 | 8/1985 |
| EP | 0 365 337 | 4/1990 |
| EP | 0 424 741 | 5/1991 |
| EP | 0 465 201 | 1/1992 |
| EP | 0 508 886 | 10/1992 |
| EP | 0 603 916 A2 | 6/1994 |
| EP | 0 841 782 | 5/1998 |
| EP | 0 853 441 A2 | 7/1998 |
| GB | 2 283 645 | 5/1995 |
| GB | 2 311 700 | 10/1997 |
| GB | 2 336 075 | 10/1999 |
| GB | 2 337 674 | 11/1999 |
| GB | 2 343 816 | 5/2000 |
| GB | 2 344 030 | 5/2000 |
| WO | WO 96/34474 | 10/1996 |

OTHER PUBLICATIONS

U.S. patent Application Ser. No. 09/286,470 filed Apr. 6, 1999, Copending.
U.S. patent Application Ser. No. 09/417,102 filed Oct. 13,1999, Copending.
U.S. patent Application Ser. No. 09/645,569 filed Aug. 25, 2000, Copending.
WPI Abstract Accession No. 97–269820/1997 & JP090098171 (Hitachi) Aug. 4, 1997.
WPI Abstract Accession No. 93–390998/1993 & JP05292091 (Mitsubishi Electric) May 11, 1993.

* cited by examiner

Primary Examiner—Wellington Chin
Assistant Examiner—Brenda Pham
(74) Attorney, Agent, or Firm—Nixon & Vanderhye P.C.

(57) ABSTRACT

A network switch comprises a first device which includes a store for data packets, a second device which includes a plurality of ports from which the packets may be transmitted, a plurality of temporary stores each associated with one of the ports, a data bus connecting the first device to the second device, a unit for maintaining a count of units of storage space in respect of each of the ports, a unit for incrementing the respective count on transmission of data from one of the stores, and a unit for decrementing the count in response to dispatch of data from the temporary store in the first device to the second device.

22 Claims, 2 Drawing Sheets

CREDIT-BASED SCHEME FOR HIGH PERFORMANCE COMMUNICATION BETWEEN DEVICES IN A PACKET-BASED COMMUNICATION SYSTEM

FIELD OF THE INVENTION

This invention generally relates to packet-based communication systems and more particularly to enabling communication between devices, such as individual chips, at very high rates of data transfer.

BACKGROUND TO THE INVENTION

When data transfer at very high rates is required between devices, and particularly between integrated circuits in a multi-chip design, such as a gigabit switch, standard communication techniques have drawbacks which affect performance. In packet-switched systems, data which is temporarily stored in a particular device is very often destined for one of many 'ports' in a destination device. It is critical that when the time comes to transfer such temporarily stored data, the source device should possess an indication that there is space available in the memory of the destination device. The customary way of achieving this requirement is to interrogate the destination device to discover whether such space exists, at the time the data transfer needs to occur. At low rates of throughput, such a preliminary operation, or 'handshake', does not necessarily impose any unacceptable delay on the speed of transfer. At very high rates of transfer, such as above 100 megabits per second and typically at 1 gigabit per second or more, the time required to perform the preliminary interrogation and response to it becomes significant compared with the data rate and represents non-recoverable 'dead' time and generally degrades the performance of the system.

BRIEF SUMMARY OF THE INVENTION

In general terms, the present invention is based on the maintenance of a system of credits, representing units of memory space which is reserved in respect of each of the ports of a destination device. At a source device, a count is maintained of such credits or units of space available. Provided that there are enough credits available at a source device to fit the quantity of data which needs to be transferred to a given port of a particular destination device, data transfer from the source to the destination device may be initiated immediately. As data is transferred from source to destination, the credit counts are diminished whereas when data is transmitted from a given destination port, the respective count maintained at the source device may be incremented. It should be appreciated that the incrementing and decrementing of the counts of units of available space will be made to occur 'off-line', namely not on the critical path for data transfer. In effect, provided that sufficient initial credits are allocated data transfer between devices may occur with a minimum of unnecessary latency.

The invention is particularly intended for a network switch which comprises a multiplicity of chips (such as four) each of which can receive data packets at any one of a set of ports and can direct packets to ports either on the same chip or to ports on any other of the chips. Thus any of the chips can be a 'source device' and any can be a 'destination device' for the purposes of the invention.

In a preferred form of the invention, the or each source chip includes memory space for data packets which can be transmitted to a destination chip by way of a high-speed bus. At the destination chip there is an input buffer or store for data received by way of the bus from the source chip and in general a respective input buffer store for each source chip connected to the destination chip. It is desirable that in any event there is a check made on each input buffer for sufficient storage space for a packet or frame of maximum size and an enabling signal confirling the availability of such space may be conveyed to the source chip by way of a data channel other than the aforementioned data bus. The or each destination chip includes a store such as a fifo buffer for each port from which data is to be transmitted. Initially, there is allocated a certain space in each transmit fifo buffer, the allocation representing a particular number of units of storage space in the buffer. A credit count is maintained for each port at each source chip. Each time the destination chip transmits a quantity of data (equivalent to the relevant storage space), the destination chip signals the source chip to enable the source chip to increment the respective count maintained in relation to the port in the destination chip. For each transmission of data corresponding to the unit of memory space, the respective port space count is decremented.

Several advantages accrue from the scheme envisaged herein. In particular, there is no necessity to reserve space in the transmit stores for the case where a packet is destined for it from each source chip simultaneously. Further, the system enables a decoupling of the 'fullness' of the pipeline from the status of a transmit buffer. There is no need to reserve space in the transmit buffers for packets currently in the pipeline. Further, packets in the input buffers of the destination device are always guaranteed space in the transmit buffers and therefore cannot normally block the data path.

These and other features and advantages of the invention will be apparent from consideration of the following description of a preferred embodiment of the invention.

DETAILED DESCRIPTION

Figure 1:
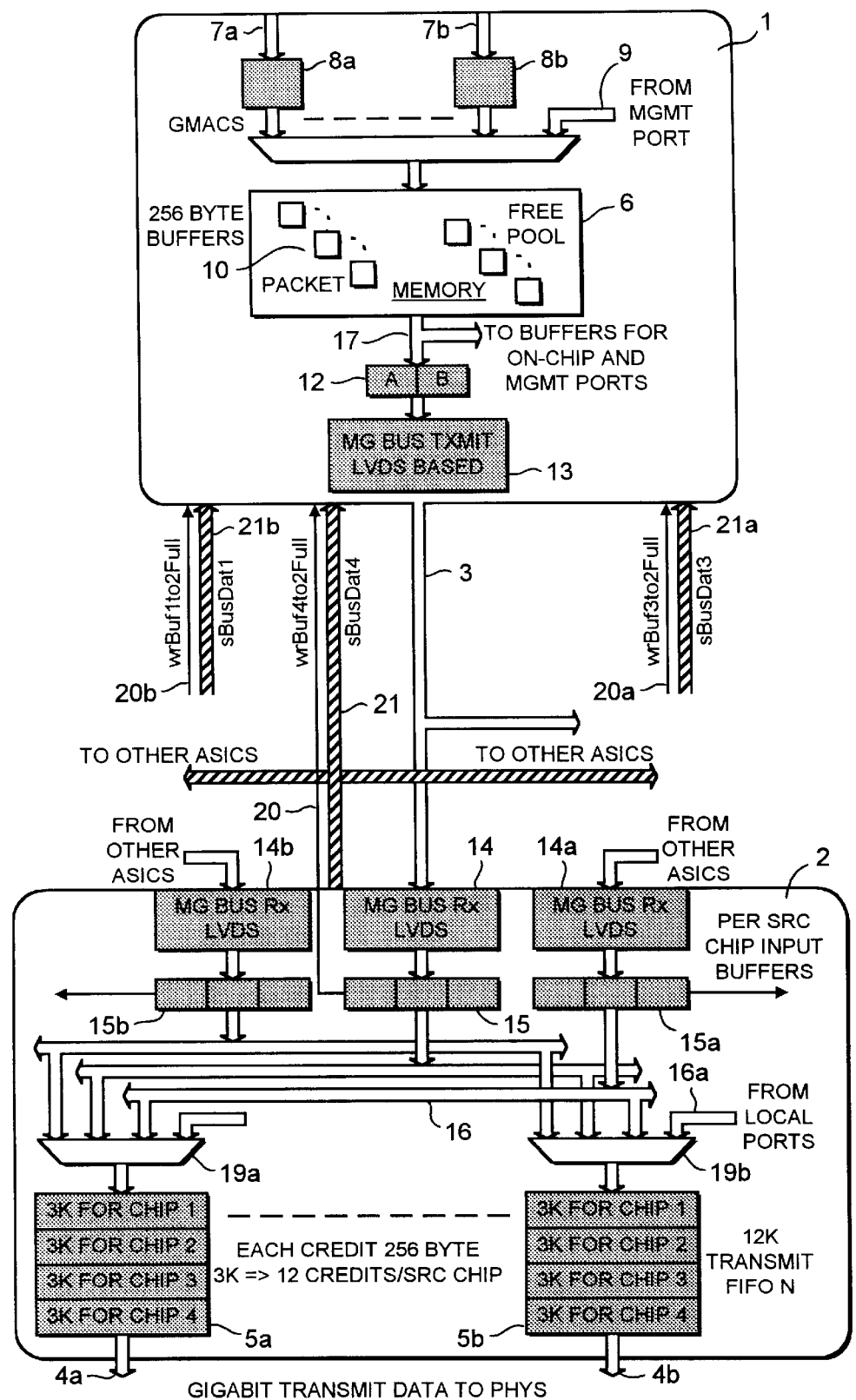
FIG. 1 is a schematic drawing of a system including a source chip, a destination chip and a high-speed bus connecting these chips.

FIG. 1 illustrates schematically a network switch including a first device, constituted by a 'source' chip 1, and a second device, constituted by a 'destination' chip 2, which may form part of, for example, a switch for use in a data communication system in which data is conveyed in addressed packets which are used to control the routing of data throughout the system. Commonly, a network switch or other device is composed of a multiplicity of individual devices or chips and it is necessary to transfer data, preferably at very high speeds, from one individual device to another. In the present example, it is assumed that the chip 1, which in the system to be described is a source chip, receives data at a high rate such as a gigabit rate, from some other devices (not shown). Data packets temporarily stored in chip 1 may be transferred by way of a high-speed link or bus 3 to the chip 2 which has a multiplicity of output ports 4a, 4b etc, of which only two are shown for the sake of simplicity. Associated with each output port 4a, 4b, etc is a respective temporary store 5a, 5b, which in this embodiment may be constituted by fifo (first-in, first-out) stores. It is necessary to provide storage at the output ports since immediate transmission from the 'destination' chip of any given packet may not be feasible owing to a variety of circumstances further downstream.

Data packets which are received from other devices by the 'source' chip 1 are stored in a temporary store 6, which in this embodiment of the invention may be a large volume dynamic random access memory organised under software control, in accordance with known practice, to define a multiplicity of buffers which can be queued for transmission of data and as more particularly described with reference to FIG. 2.

The present invention will be described on the basis that the memory 6 is a buffer-based chip but the invention is applicable to different systems, wherein the memory 6 is constituted by one or more than one fifo store.

The main object of the invention is to minimize and preferably eliminate any delay arising from the possibility that a packet transferred from the store 6 by way of the bus 3 becomes blocked because there is insufficient space in the fifo stores 5a and 5b. This is particularly relevant where these fifo stores need to temporarily store packets coming not only from the chip 1 but other chips within the device, as explained hereinafter. It is possible to guard against a worst case condition, wherein packets are destined for a particular fifo store (such as fifo 5a) from each source chip simultaneously, but coping with such worst case conditions requires the reservation of excessive storage space in the transmit fifos.

The main elements of the system composed of the chips 1 and 2 and bus 3 will be described in the following.

The chip 1 receives data by way of ports such as ports 7a and 7b, and packets received at those ports are passed by way of receivers 8a and 8b (described in FIG. 2) and a multiplexer 9 to the buffer store 6. A store 6 arranged on ordinary buffer store lines generally has a 'free pool' of buffers which are available for storage and queuing and buffers which temporarily hold packets and which are queued for the transmission of the data packets from the chip 1. Data packets read out from the buffer store 6 are conveyed by way of an internal bus 11 by way of a temporary packet buffer 12 and a physical layer 13, constituted for example by a differential line driver connected to a data bus 3. It will be understood that the particular form of the bus 3 and the physical layer 13 are not of significance to the invention. The bus 3 might be constituted by a multiplicity of lines down which data is transmitted serially, there being for example eight data lines and a ninth, control, line as described in our earlier patent applications Ser. Nos. 9806747.3 and 9806748.1, filed Mar. 30, 1998.

The bus, however constituted, is coupled to a receiver 14 which may recover the data transmitted by way of the bus and is coupled to send received data packets or blocks to an input fifo store 15.

Likewise, receivers 14a, and 14b, which may be similar to receiver 14, may receive data from other chips and read packets into respective input fifos 15a and 15b.

The input fifo 15 and any other of the input fifos 15a, 15b etc are connected by an internal bus system 16 to multiplexers 19a, 19b which are coupled to the fifo stores 5a, 5b etc.

Each of the input fifos 15 etc in the 'destination' chip 2 may be organised to provide, on a respective line 20, 20a etc respectively, a signal which, if asserted, denotes that the respective input buffer is full. Such a signal will unconditionally inhibit the transmission of data from memory 6 onto the bus 3. However, as will be described with respect to FIG. 2, the line 20 may be used to increment a credit count maintained in chip 1 for the input fifo 15.

Since source chip 1 may provide data to other destination chips (not shown), the Figure illustrates lines 20a and 20b which convey signals relating to the other input fifos 15a, 15b back to the source chip from other destination chips (not shown).

In accordance with the invention, each source chip which provides data to the destination chip 2 is initially allotted a prescribed minimum space in each fifo 5a, 5b etc. The space is represented by a notional 'credit' which is denoted by a credit count held in the chip 1. Further according to the invention, each time data corresponding to a unit of space or credit is transmitted from the chip 2, a signal is sent back to the relevant source chip 1 to cause the credit count to be incremented. A bus 21 connects the destination chip 2 with the 'source' chip that transmit data to the destination chip 2. The information defining the incrementing of the count is represented by the format of the word on this bus, which indicates which transmit port credit should be incremented.

Further, each time a particular source chip 1 sends data corresponding to a unit of space to a remote port, the source chip decrements the relevant credit count.

In a specific example, each 'credit' may correspond to 256 bytes and each fifo store 4a, 4b, may be associated with twelve 'credits' (3 k bytes) for each source chip, such as the chip 1, to which the destination chip is connected. Thus, each time 256 bytes are sent over bus 3, the credit count in chip 1 is decremented and each time the transmitter chip transmits 256 bytes, a signal back to the relevant source chip by way of, for example, bus 21 causes the source chip to increment the credit count.

The source chip 1 includes a flow control (i.e. in the software control of the buffer store 6) that prevents the dispatch of packets to the chip 2 if the respective count has been decremented to a datum which denote no or insufficient space in the respective output store (5a, 5b etc).

Figure 2:
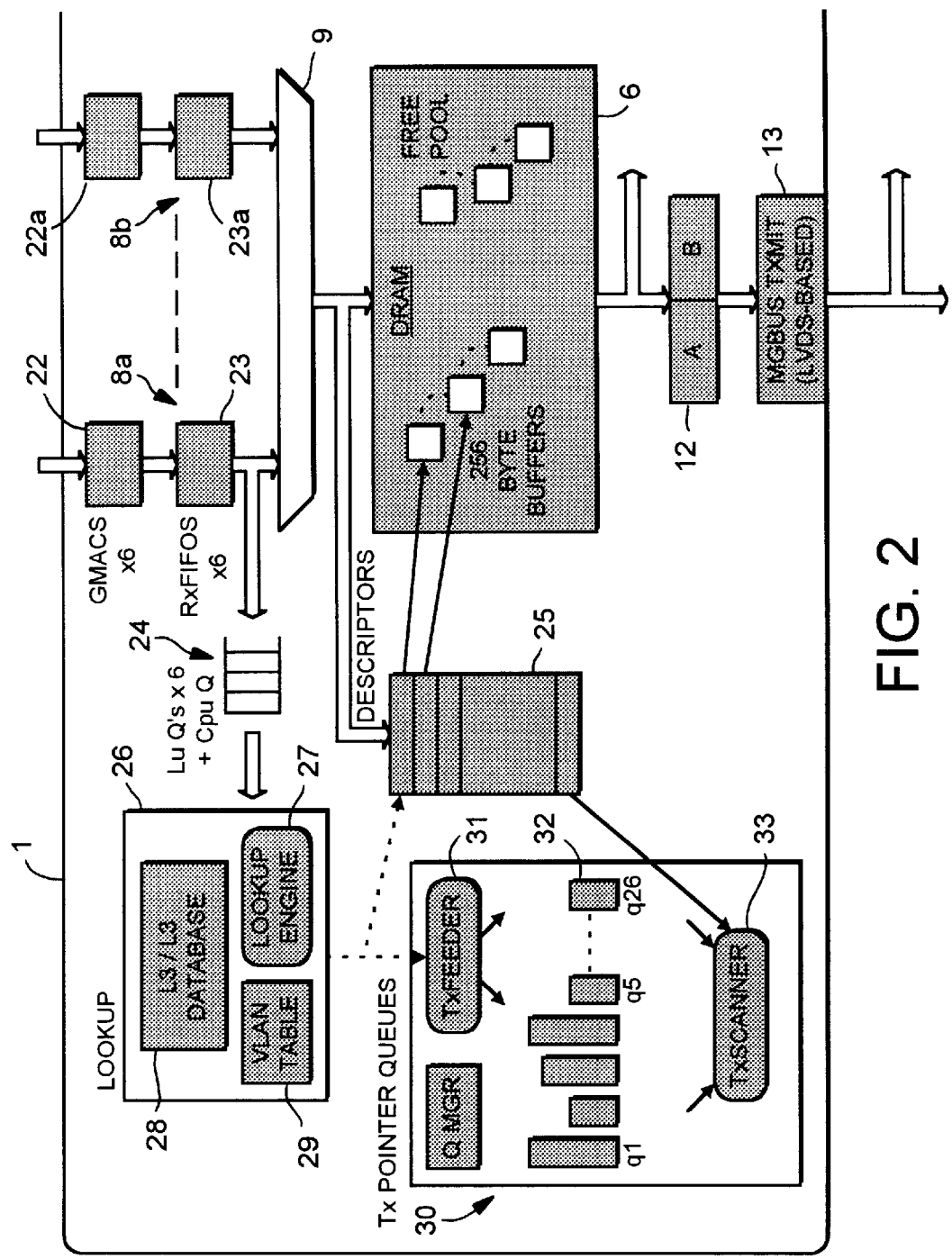
FIG. 2 illustrates a source chip in greater detail.

FIG. 2 illustrates in greater detail the source chip, in order to indicate how, preferably, data packets are received in the chip and transferred from the chip to another chip forming part of the switch, the transfer being partially controlled in accordance with the credit counts aforementioned.

Data from external physical layers is received at the receiver stages 8a, 8b respectively. Each stage 8a and 8b comprises a packet framer 22 followed by a temporary store, such as a fifo store 23, which stores packets temporarily before they are transferred to the dynamic random access memory 6. The status of each packet, consisting of size information, error information and the like, may be stored alongside the packet data in a 'status' fifo, not shown for the sake of simplicity.

For each data packet which is received, a free buffer, typically a 256-byte buffer, in the dynamic random access memory 6 is requested and acquired and data streamed to the memory 6. On the way to the memory 6, header information may be extracted from each packet and placed in a look-up queue, illustrated diagrammatically by the queue 24.

A descriptor exists for each buffer in the memory 6. The descriptors are stored in a table 25. The descriptor for a buffer which is currently receiving data is written with information such as the byte count, the VLAN identifier and other information relating to the packet. If a packet does not fit in to the first buffer, a second buffer may be fetched from the free buffer pool and the pointer of that buffer may be chained to the descriptor entry of the previous buffer. Such a process may continue as necessary until the full packet is written into the memory 6.

Normally, the look-up queue will be limited in length and if the length becomes excessive, the input line to the chip may be subject to flow control, that is to say the reception of further packets may be prevented at least temporarily. Furthermore, if the available storage space, represented by the number of 'free' buffers, in the memory 6 becomes too small, the relevant line or lines to the chip 1 may be subject to flow control.

The chip 1 includes a look-up process 26. This process (under software control) determines the destination ports for each packet, the destination being based on either layer 2 (media access control) or layer 3 (network address) information, VLAN information and so on.

A result of the look-up, conveniently termed look-up result bit mask, is applied by means of a program tool, called herein a transmit feeder, within a transmit pointer queue process 30. The transmit feeder 31 places an entry on all relevant transmit pointer queues 32, as described by the destination bit mask for each packet. In this example, each chip may contain one transmit pointer queue for each destination port in the switch, whether that destination port is on the same chip or one of the other chips constituting the switch. For a four-chip switch, each destination port has four queues, one nearby in the same chip as it resides, and one on each of the other chips. Such an arrangement allows fast, non-blocking queueing of packets for transmission, independent of memory access times or access latency for the communication bus 3.

The pointer process 30 includes a program tool identified herein as a 'transmit scanner' (33), the purpose of which is to remove entries from each queue and enable the transfer of packets from occupied buffers in the memory 6 to the transmit fifos which are on the same chip or other chips (such as chip 2).

The transmit scanner 33 may perform arbitration and other control processes on the transmit queues but such will not be described because the present invention is concerned with the process of determining whether there is appropriate space within the fifos 5a, 5b etc as a possible inhibition on the transfer of packets from the memory 6, thereby to avoid unnecessary blocking.

The transmit scanner retrieves information from all descriptors chained for a packet at the top of the respective transmit queue. These descriptors include various information which will form part of a header field at the front of a packet and include an identification of the chip. The transmit scanner requests access to the random access memory 6. When that access is granted, the transmit scanner 33 fills either the buffer A or the buffer B in the transmit buffer 12 and thereby dumps the packet across the bus 3 to the buffers 15 and then to the remote port's fifo 5a, 5b etc.

Once a full packet is removed from the memory and transferred to the remote chip, the transmit scanner causes the return of the relevant buffer or buffers to the free pool. A pointer for each buffer may have an ownership bit which determines whether the buffer is owned by the process or not.

The transmit scanner verifies that certain resources (i.e. transmission space) are available in the transmission path before it selects a particular transmit queue. One resource check relates to the availability of prescribed buffers (in memory 6) which are used to hold an entire packet temporarily during a data burst from the memory 6. A second check verifies whether the input fifo store at the chip 2 is temporarily congested. Such a check involves monitoring the status signalled on the relevant line 20, 20a, 20b etc as previously described. The input fifos are located at the input stage of each destination chip (2), there being three such fifos (15, 15a and 15b) in each chip. Each of these input fifos is 4.5 kilobytes in size. Such a size allows three maximum packets in each fifo. Therefore the credit count associated with each fifo is 18. A counter located in the transmit scanner block in the chip that provides an output to the corresponding bus 3. There are three such counters in each transmit scanner, each one reflecting the status of three remote fifos to which it sends data.

The transmit scanner decrements the credit count for the fifo of the remote chip as it prepares to send data to that chip. A controller in the relevant program segment monitors the input fifo as data is being removed from it. The controller communicates over one of the three signal lines 20, 20a, 20b to the correct credit counter in the transmit scanner, asserting the line for a clock cycle to increment the counter by one.

The third resource check ensures that the transmit fifo relevant to the destination port has space for the entire packet. As previously indicated, this check is made in conjunction with the status bus 21.

The function of the status bus is to communicate status information from the transmit fifos and the input fifos 15 back to the transmit scanners. It is necessary because there is no explicit 'back pressure' mechanism when transferring a packet from the memory 6 to the transmit fifos. The transmit scanner needs to know that there is space for a maximum sized frame in each relevant transmit fifo.

Each transmit scanner 'block' includes counters which store a count for each of the transmit fifos in the remote chips.

In the present example, each transmit fifo has a capacity of 12 kilobytes. There are forty-eight credits in total allocated to a transmit fifo. Such a system guarantees 3 kilobytes of storage in a transmit fifo for each of the four chips making up the switch. The scheme requires each transmit scanner to keep a count of up to twelve credits for each of the twenty-four transmit fifos in the four chips. The transmit scanner automatically decrements the credit count for a particular transmit fifo when preparing to transfer a packet from the memory 6. The status bus (21) is used to communicate information to increment the credit count as data is transmitted from the transmit fifo.

A 'GTx' block (not explicitly shown) determines which credit count has to be incremented. This is the program control for a transmit fifo. There is a GTx block for each transmit fifo (i.e. each port). The GTx block has the function of filling and emptying the respective transmit fifo. Such a block identifies which chip sent the data to the transmit fifo. It will examine the particular identifying field in the packet header, at the front of each packet in the transmit fifo, to determine which of four possible credit counters (one for each chip) should be incremented. The GTx block communicates this information to a central status bus transmit block. If the counter is local to the same chip, the information is sent by this status bus transmit block over an internal bus. Otherwise the information is broadcast on the external status bus 21.

There are several advantages in a scheme as described above. Excessive space does not need reserving in the transmit fifos to accommodate a condition wherein a packet is destined for it from each source chip simultaneously. Further, the system decouples the 'fullness' of the pipeline from the status of the transmit fifo stores 5a, 5b etc. The significance is that it is not necessary to reserve space in the fifo stores 5a, 5b etc. for packets currently in the pipeline. For the same reason, packets in the input buffers are guaranteed space in the fifo stores 5a, 5b, because those packets cannot be transmitted on the bus 3 unless there is already space in the stores 5a, 5b.

The system may be modified so that the size of a packet is examined before there is any check for size in the transmit fifo. One need only check that there are enough credits for a particular packet size in the credit count.

What is claimed is:

1. A network switch for receiving and transmitting of addressed data packets, the network switch comprising:
   a multiplicity of distinct application specific integrated circuits (ASICs), including at least one source ASIC and at least one destination ASIC, said source ASIC and said destination ASIC each having a multiplicity of ports for forwarding addressed data packets;
   said source ASIC including means for receiving data packets, means responsive to address data in received data packets to lookup to which destination port(s) the packets are destined and to allot packets to respective queues according to destination and means for maintaining a respective count of memory space credits for each of said ports of the destination ASIC, for decrementing the respective count on dispatch of a packet from said source ASIC and for incrementing the respective count;
   an internal data bus for transmitting data packets dispatched from said source device to said destination ASIC,
   said destination ASIC including means for receiving packets from said source ASIC by way of said internal data bus, and at least one temporary store for storing data packets, prior to dispatch of such packets from a port of said destination ASIC, received from said first ASIC by way of said internal data bus; and
   a controller responsive to transmission of packets from said temporary store to signal to said incrementing means in the source ASIC to increment the respective count.

2. A network switch according to claim 1 wherein each respective count is in terms of credits each corresponding to a multiplicity of bytes.

3. A network switch according to claim 1 wherein said source ASIC prevents the dispatch of packets to the destination ASIC if a respective count denotes insufficient space in said temporary store in the destination ASIC.

4. A network switch according to claim 1 wherein said temporary store is a FIFO.

5. A network switch according to claim 1 including an internal signal bus for conveying status information from the temporary store to the source ASIC.

6. A network switch comprising:
   a plurality of distinct ASICs;
   at least one ASIC being a destination ASIC having a multiplicity of ports for forwarding data packets and for each port a temporary store for data packets received from others of the ASICs; and
   at least two others of the ASICs being source ASICs, each source ASIC including receivers for data packets and memory for storing received data packets and each source ASIC performing a look-up in response to address data in said data packets to determine to which destination port(s) said packets are destined, wherein at least some of said data packets are destined for said ports of said destination ASIC; and
   an internal data bus coupling said ASICs for conveying data packets from said source ASICs to said destination ASIC;
   wherein each source ASIC maintains a respective count of storage space for packet data in each of said temporary stores, decrements a respective count when packet data is dispatched to said destination ASIC, and increments a respective count in response to status information from a respective temporary store when packet data. is dispatched from said respective temporary store in the destination ASIC.

7. A network switch according to claim 6 further comprising a signal bus for conveying said status information from said temporary stores to said source ASICs.

8. A network switch according to claim 6 wherein each source ASIC prevents transmission of data packets to said destination ASIC if a respective count denotes insufficient storage space in a respective temporary store in said destination ASIC.

9. A network switch according to claim 6, wherein at least one of the temporary stores of the destination ASIC is capable of storing data packets conveyed from the at least two source ASICs.

10. A network switch comprising:
    a plurality of distinct ASICs, and an internal data bus system for conveying data packets between the ASICs, and wherein
    each of said distinct ASICs includes a multiplicity of destination ports for forwarding data packets;
    the plurality of ASICs includes at least one destination ASIC which includes at least one temporary store for data packets;
    the plurality of ASICs includes at least one source ASIC which includes receivers for data packets and a memory for storing received data packets and each source ASIC includes means for performing a look-up in response to address data in data packets to determine to which destination port(s) said data packets are destined, wherein at least some of said data packets are destined for a port of a destination ASIC and at least some others of said data packets are destined for a port of the respective source ASIC; and
    each source ASIC maintains a respective count of storage space for packet data in each temporary store, decrements a respective count when packet data is dispatched to a destination ASIC and increments a respective count in response to status information from a respective temporary store when packet data is dispatched from said respective temporary store in the destination ASIC.

11. A network switch according to claim 10 further comprising a signal bus for conveying said status information from each temporary store to each source ASIC.

12. A network switch according to claim 11 wherein each source ASIC prevents transmission of data packets to a destination ASIC if a respective count denotes insufficient storage space in a respective temporary store in that destination ASIC.

13. A network switch according to claim 11 wherein said at least one temporary store comprises a respective FIFO for each destination port.

14. At network switch according to claim 10, wherein each of the source ASIC(s) can act as a destination ASIC and each of the destination ASIC(s) can act as a source ASIC.

15. A network switch comprising:
    a plurality of distinct ASICs, and an internal data bus system for conveying data packets between the ASICs, and wherein:
    each ASIC includes a multiplicity of ports for forwarding data packets;
    the plurality of distinct ASICs comprises at least one destination ASIC which includes a temporary store for each of the respective ports;

the plurality of distinct ASICs comprises at least one source ASIC which includes receivers for data packets and memory for storing received data packets and each source ASIC includes means for performing a look-up in response to address data in data packets to determine to which destination port(s) said data packets are destined, wherein at least some of said data packets are destined for a port of the respective source ASIC and some other data packets are destined for a port of a destination ASIC; and each source ASIC maintains a respective count of storage space for packet data in each temporary store, decrements a respective count when packet data is dispatched to a respective temporary store and increments a respective count in response to status information from a respective temporary store when packet data is dispatched from said respective temporary store.

16. A network switch according to claim 15 further comprising a signal bus for conveying said status information from each temporary store to each source ASIC.

17. A network switch according to claim 16 wherein each source ASIC prevents transmission of data packets to a destination ASIC if a respective count denotes insufficient storage space in a respective temporary store in that destination ASIC.

18. At network switch according to claim 15, wherein each of the source ASIC(s) can act as a destination ASIC and each of the destination ASIC(s) can act as a source ASIC.

19. A network switch comprising:

a plurality of distinct ASICs, and an internal data bus system for conveying data packets from each ASIC to each of the other ASICs, and wherein:

each ASIC includes a multiplicity of ports for forwarding data packets;

each ASIC includes a temporary store for each of the respective ports;

the plurality of distinct ASICs comprises at least one source ASIC which includes receivers for data packets and memory for storing received data packets and each source ASIC includes means for performing a look-up in response to address data in data packets to determine to which destination port(s) said data packets are destined, wherein at least some of said data packets are destined for a port of the respective source ASIC and some other data packets are destined for a port of a destination ASIC of the plurality of distinct ASICs; and each source ASIC maintains a respective count of storage space for packet data in each temporary store, decrements a respective count when packet data is dispatched to a respective temporary store and increments a respective count in response to status information from a respective temporary store when packet data is dispatched from said respective temporary store.

20. A network switch according to claim 19 further comprising a signal bus for conveying said status information from each temporary store to each source ASIC.

21. A network switch according to claim 20 wherein each source ASIC prevents transmission of data packets to a destination ASIC if a respective count denotes insufficient storage space in a respective temporary store in that destination ASIC.

22. At network switch according to claim 19, wherein each of the source ASIC(s) can act as a destination ASIC and each of the destination ASIC(s) can act as a source ASIC.

* * * * *